June 8, 1965  R. E. HOLDEN  3,188,264
LOOSE FILL PACKING MATERIAL
Filed Dec. 21, 1962  2 Sheets-Sheet 1
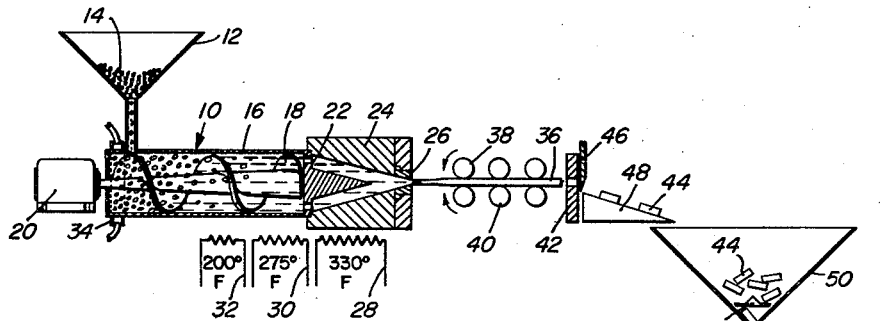
Fig. 1
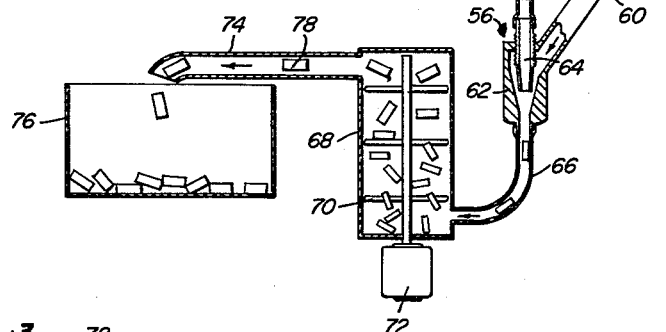
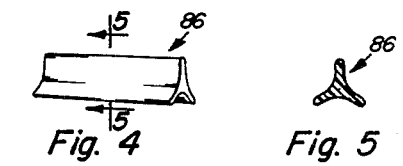
Fig. 2  Fig. 3  Fig. 3A
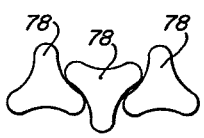
Fig. 4  Fig. 5
Fig. 6A  Fig. 6B  Fig. 6C
ROBERT E. HOLDEN
INVENTOR.
BY
BUCKHORN, BLORE, KLARQUIST & SPARKMAN
ATTORNEYS June 8, 1965     R. E. HOLDEN     3,188,264
LOOSE FILL PACKING MATERIAL Filed Dec. 21, 1962     2 Sheets-Sheet 2

ROBERT E. HOLDEN
INVENTOR.
BY
BUCKHORN, BLORE, KLARQUIST & SPARKMAN
ATTORNEYS

United States Patent Office 3,188,264
Patented June 8, 1965

3,188,264
LOOSE FILL PACKING MATERIAL
Robert E. Holden, Aloha, Oreg., assignor to Tektronix, Inc., Beaverton, Oreg., a corporation of Oregon
Filed Dec. 21, 1962, Ser. No. 247,469
9 Claims. (Cl. 161—168)

The subject matter of the present invention relates generally to articles made from expandable thermoplastic material, and in particular to loose fill packing material in the form of a plurality of expanded members of resilient thermoplastic foam which are made in an interlocking configuration in order to prevent relative movement between adjacent members.

The thermoplastic members of the present invention are especially useful in the packaging of electronic devices, such as cathode ray oscilloscopes, microwave tubes and other delicate equipment. The expanded thermoplastic members provide good heat insulation as well as electrical insulation, and they may be used for these purposes rather than for packaging. The present packing material has several advantages over conventional packing material, including the fact that the cellular structure of the thermoplastic foam employed in the packing members provides the members with resilience so that they cushion against shock and vibration, and resist crushing or permanent deformation. Also, the interlocking configuration of the packing members of the present invention prevents settling of the packing material in the container around the apparatus being shipped in order to maintain such packing material more evenly distributed in such container, so that projecting portions of the apparatus are not exposed to the force of blows received during shipment.

Previously employed loose fill packing material such as shredded newspaper, popcorn and the like has been subject to moisture absorbtion, fungus growth and vermin infestation. However, these disadvantages are eliminated by the thermoplastic packing material of the present invention. In addition to these improved packaging characteristics, the present loose fill packing material is more easily loaded into the containers used for shipment and at a faster rate of speed due to the fact that the resilient thermoplastic members are of a pourable configuration. This interlocking configuration together with the rather high coefficient of friction of the expanded thermoplastic material prevents adjacent, contacting members from moving with respect to each other.

It is therefore one object of the present invention to provide resilient members of expanded thermoplastic material with an interlocking configuration in order to prevent the relative movement of adjacent members.

Another object of the present invention is to provide an improved loose fill packing material in which a plurality of resilient members of expanded thermoplastic material are employed, such members being of a shape which enables them to be poured into a container and to interlock with each other in order to prevent settling of the packing material due to relative movement between adjacent members in contact with one another.

A further object of the present invention is to provide an improved loose fill packing material which does not readily absorb moisture, prevents fungus growth and is not subject to vermin infestation.

A still further object of the invention is to provide an improved packing material of plastic foam which is a good heat insulator and electrical insulator.

An additional object of the present invention is to provide an improved loose fill packing material of low density and high resiliency, which cushions against shock and mechanical vibration, and resists crushing.

Still another object of the present invention is to provide a substantially unexpanded element of thermoplastic material containing an expanding agent, such element being of a generally cylindrical shape and having a cross section of a shape which will provide an interlocking configuration to the member obtained by expanding such element.

Other objects and advantages of the present invention will be apparent from the following detailed description of certain preferred embodiments thereof and from the attached drawings of which:

FIG. 1 is a schematic diagram of apparatus which may be employed to form the thermoplastic members of the present invention;

FIG. 2 shows the preferred embodiment of the expanded thermoplastic member of the present invention;

FIG. 3 is a vertical section view taken along the line 3—3 of FIG. 2 showing a cross section of the interlocking configuration of the thermoplastic member;

FIG. 3A is an end view of the packing material of the present invention showing the interlocking action of the members of FIGS. 2 and 3;

FIG. 4 shows the unexpanded thermoplastic member which may be produced by the apparatus of FIG. 1 if the thermoplastic material is immediately cooled after it leaves the extrusion die and is not transmitted through the post expander;

FIG. 5 is a vertical section view taken along the line 5—5 of FIG. 4 showing the cross section of the unexpanded thermoplastic member;

FIGS. 6A, 6B and 6C are cross sections of different interlocking configurations for the expanded thermoplastic member;

Figure 7:
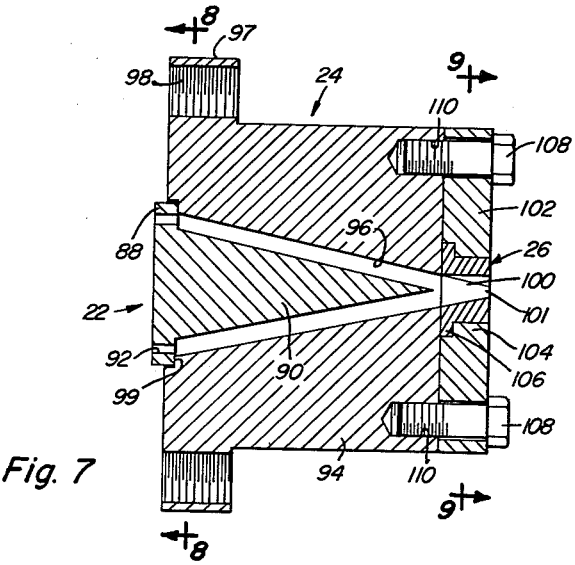
FIG. 7 is an enlarged sectional view of the extruder nozzle and die employed in the apparatus of FIG. 1.

The apparatus of FIG. 1 includes an extrusion device 10 and a supply hopper 12 containing a dry mixture 14 of expandable thermoplastic extrusion grade beads or pellets and suitable nucleating agents, which flows from the hopper into the extrusion device where it is treated in a manner hereafter described. The thermoplastic beads may be made of polystyrene or other suitable polymers as disclosed in United States Patent No. 2,983,692 entitled, "Preparation of Expandable Ethylenically Unsaturated Polymer Particles and Cellular Product Therefrom," which issued May 9, 1962, to D'Alelio. For example, a mixture by weight of 98.245% extrusion grade expandable polystyrene beads, sold by Koppers Company of Delaware under the trademark "Dylite" and designated F-133, 1.0% sodium bicarbonate expanding agent, 0.7% citric acid and 0.055% blue pigment designated Heliogen blue D.S. Toner 569 has been employed with good success.

The extrusion device 10 may include a hollow, cylindrical container 16 and a variable root diameter extruder screw 18 mounted for rotation inside the extruder container and driven by an electric motor 20 positioned outside such container adjacent the front end thereof. The rear end of the extruder container 16 is closed by a breaker plate 22, an extruder head 24 and an extrusion die 26 which are described in more detail with reference to FIGS. 7 to 9. A plurality of electrical heating elements 28, 30 and 32 may be provided adjacent the extrusion device 10 in order to provide three different heating zones for the material 14 in such extrusion device. Thus, the heating element 28 may provide a temperature of about 330° F. inside the extruder head 24, while the heating elements 30 and 32 may provide temperature zones of 275° F. and 200° F., respectively, inside the extruder container 16 adjacent the rear end of such container and an intermediate portion thereof. The front end of the extruder container 16 may be surrounded by a cooling jacket 34 to lower the temperature of the container at that position below the melting temperature of the mixture 14 by flowing water or other coolants through such jacket. This allows the mixture 14 to exist in a solid form inside the front end of the extruder container 16 until it proceeds through the heating zones where it is melted so that the solid material pushes the liquid mixture through the breaker plate 22 and the extrusion die 26 in a manner hereafter described.

The rotation of the extruder screw 18 at a speed of about 80 to 90 r.p.m. moves the mixture of thermoplastic beads and added materials from the front end of the extruder container 16 toward the breaker plate at the rear end thereof. As the solid material is moved along by the extruder screw, it is subjected to a progressively higher pressure due to the increasing root diameter of the screw and its corresponding reduction in thread height. At the same time the mixture is heated to a higher temperature until the mixture melts into a viscous liquid mixture of thermoplastic material and expanding agent somewhere in the container 16 before reaching the breaker plate 22. The liquid mixture is then forced through openings in the periphery of the breaker plate 22, which work the liquid and produce a more uniform mixture, into the nozzle formed by the breaker plate and extruder head. The nozzle maintains such liquid under pressure and forces it through the opening in the extrusion die 26 before the expanding agent releases its gas for the most desirable operation of the extruder apparatus. Thus a combination of temperature and pressure is maintained within the extruder container 16 and the extruder head 24 so that expanding of the thermoplastic material does not take place until after it leaves the die 26. It should be noted that this is one reason why the cooling jacket 34 is employed since the solid material is under little pressure at this position in the container 16 so that the expanding agent could easily be heated above its boiling point and produce carbon dioxide or other hydrocarbon expanding gas which would be forced back through the supply hopper 12 to interfere with the even feeding of material from such hopper. Of course, it is necessary to maintain the material in the front end of the container under low pressure to allow the air to be removed from the mixture as it is compressed by the extruder screw.

As the liquid thermoplastic material leaves the die, reduced pressure allows the expanding agent to release its gas and expand the thermoplastic into a cellular structure. This produces a strip 36 of partially expanded thermoplastic foam after the material cools enough to solidify a short distance from the die. The foam strip 36 is drawn forward from the die by two sets of oppositely rotating conveyor rollers 38 and 40 which are positioned on opposite sides of the strip, and fed through an aperture in a cutter plate 42 so that it can be cut into short cylindrical members 44 of partially expanded thermoplastic material by a rotating knife blade 46.

A discharge chute 48 is positioned adjacent the cutter 42 and 46 to direct the partially expanded members 44 into a feeder hopper 50. The feeder hopper 50 may be of a funnel shape with a small cone-shaped insert 52 positioned adjacent the small end of such funnel to allow the members to move from the hopper into a tubular feed line 54 without jamming.

The partially expanded members 44 are sucked through a feed line 54 connected to the bottom of the feeder hopper, by vacuum pressure created in such feed line due to the passage of pressurized steam over a venturi 56 located in such feed line. The steam enters the venturi through a steam pipe 58 which may be provided with a valve 60 to control the pressure of such steam as it enters the venturi. This venturi 56 may be in the form of a T-shaped sleeve 62 and a hollow conical insert 64 which extends coaxially with the feed line 54 to transmit the members 44 from the feed line through the venturi into a connecting line 66. The insert 64 is screw threaded into the sleeve so that the position of the tip of the insert can be adjusted with respect to the connection of the sleeve with the steam pipe in order to vary the volumn of the cavity within the venturi. The velocity of the steam increases as it passes from the pipe 58 through the venturi into the connecting line 66 thereby reducing the pressure within the insert 64 and the feed line 54. By proper adjustment of the insert 64 with respect to the sleeve 62 the velocity of the steam can be increased until a sufficient vacuum exists in the feed line so that the members 44 are withdrawn from the hopper 50 and sucked through the lead line 54 into the connecting line 66.

The connecting line 66 extends to the bottom of a post expansion drum 68 to feed the partially expanded members 44 into the drum along with an amount of steam sufficient to heat such members and cause them to expand further. A stirring member 70 may be positioned within the drum 68 and rotated by an electric motor 72 located outside of the drum in order to agitate the thermoplastic members as they are being heated by the steam for more uniform expansion thereof. Since the thermoplastic members decrease in density as they are expanded, such members move upward in the drum 68 until they are expelled from the top of such drum through a discharge tube 74 to a storage container 76 as fully expanded members 78.

The preferred embodiment of the expanded thermoplastic members 78 is shown in FIGS. 2 and 3 to be of a substantially cylindrical shape. The member 78 is formed with a pair of substantially flat surfaces 80 at the opposite ends thereof and a cylindrical side surface 82 extending between such end surfaces. The side surface contains three concave reentrant portions or indentations 84 formed by parallel surface elements to give the member an interlocking configuration. As shown in FIG. 3, the expanded thermoplastic members 78 may have a trilobular cross section with three lobular extensions 85 to provide it with maximum strength and resiliency. The interlocking action of the members 78 is shown in FIG. 3A. This prevents adjacent, contacting members from sliding on each other and thereby reduces settling of the packing material.

It should be noted that the post expansion step performed by the steam heat in expansion drum 68 may be eliminated during the manufacture of the thermoplastic members so that such members may be sent to the customer in a partially expanded state 44 in order to reduce volume and cut down shipping costs. The customer can then perform the post expansion step himself before he uses the members as packing material. Of course, the partially expanded members 44 have an even more concave side surface portion than the expanded member shown in FIG. 3.

In a similar manner, a cooling material, such as water, may be caused to flow over the thermoplastic strip 36 immediately after it leaves the die 26 in order to prevent as much expansion as possible. If this extruded but unexpanded strip is then fed through the cutter 42 and 46, it is cut into a plurality of unexpanded members 86 of the generally cylindrical configurations shown in FIGS. 4 and 5. This unexpanded member is of a much higher density than the expanded member 78, and thus of much smaller dimension. Also the cross section of the unexpanded member 86 is more in the form of a Y-shape, as shown in FIG. 5, so that it is very nearly of the same shape as the die opening. Of course, this unexpanded member 86 can also be post expanded by the customer, so that it may be shipped to him in its unexpanded state thereby saving him additional shipping costs and much needed storage space.

The expanded thermoplastic member 78 may be made in a variety of different interlocking shapes having, for example, the cross sections shown in FIGS. 6A, 6B, and 6C. Thus, one expanded member may have the I-shaped cross section of FIG. 6A, while another may be provided with the substantially rectangular cross section of FIG. 6B while still another may be made in the quarter-moon cross section of FIG. 6C. It should be noted however that when the extrusion process is employed to form these members, they will usually be of a generally cylindrical shape in that their side surfaces will be formed of parallel surface elements, but this is not always true of extremely short or very long members.

Figure 9:
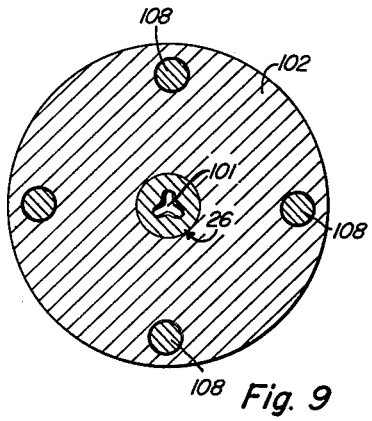
FIG. 9 is a vertical section view taken along the line 9—9 of FIG. 7.
Figure 8:
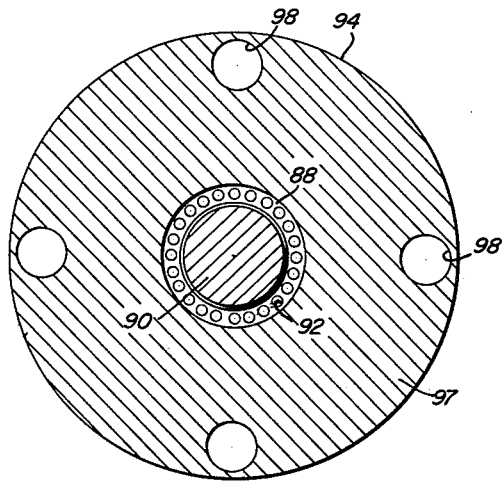
FIG. 8 is a vertical section view taken along the line 8—8 of FIG. 7.

The preferred embodiment of the breaker plate 22, extrusion head 24 and extrusion die 26 is shown in FIGS. 7, 8 and 9. The breaker plate 22 may include an annular flange portion 88 and a conical insert portion 90 extending from the rear surface of such flange portion coaxially therewith. A plurality of apertures 92 are provided through the flange portion 88 of the breaker plate 22 which may be uniformly spaced about the periphery of the flange portion 88 surrounding the base of the cone insert portion 90. The extrusion head 24 includes a hollow cylindrical block 94 having a conical shaped cavity 96 therein and an outwardly extending flange 97 having screw threaded holes 98 for mounting the block onto the extruder container 16. An annular shoulder 99 is provided in the block at the large end of the cavity 96 for engagement with the flange portion 88 of the breaker plate so that the conical insert 90 projects into the cavity, but is spaced a uniform distance from the walls thereof. This spacing between the conical insert 90 and the cavity walls of block 94 is slightly greater than the diameter of the apertures 92 in order to form a nozzle which maintains the thermoplastic liquid under high pressure as it travels through the cavity 96 in the extruder head 24 from the apertures 92 in the breaker plate 22 to the die 26.

The die 26 is in the form of a flanged cylindrical cup having a passageway 100 through such cup which forms an extension of the conical cavity 96 in block 94. An extrusion aperture 101 is provided through the bottom of the die at the small end of the passageway 100. This extrusion aperture may be in a Y-shaped configuration formed by three intersecting legs .04" wide and .0935" long which are separated by 120°, as shown in FIG. 9. Thus, the passageway 100 gradually changes from a circular cross section adjacent cavity 96 to the Y-shaped cross section of die apertures 101. The die 26 is supported in its correct position with respect to the cavity 96 by means of an end plate 102 having a cylindrical opening therein conforming to the shape of the external surface of the die. The plate 102 is provided with an annular inwardly extending shoulder 104 which engages an annular outwardly extending flange 106 on the die in order to clamp such die between the block 94 and the end plate. The end plate 102 is secured to such block by means of bolts 108 extending through holes in the plate and screwed into tapped holes 110 in the block 94.

The density of the expanded thermoplastic member 78 determines its resiliency and structural strength. Too high a density will result in lack of resiliency while too low a density will result in decreased strength so that little force is required to crush and destroy the member. Thus, in order to obtain the best possible packing or insulation characteristics, the density of the expanded member must be controlled to fit the needs of the application in which the members are employed. Such density may vary from approximately .0015 to .05 gram per cubic centimeter for most uses. For example, it has been found that a density of .0277 gram per cubic centimeter or 1.73 pounds per cubic foot is satisfactory for the density of the expanded polystyrene members 78. When expanded members of this individual density are combined together as packing material, the bulk density of such packing material is about .9 pound per cubic foot due to the air space between individual members.

The density of the expanded members is controlled by the temperature and pressure exerted upon the liquid thermoplastic material as it leaves the die 26, and the temperature within the post expander drum 68. It should be noted that high extrusion temperatures produce low densities while low extrusion temperatures produce high densities in the partially expanded members 44. This is due to the fact that at high temperatures the viscosity of the liquid polystyrene is low while the vapor pressure of the gas produced by the expanding agent is quite high. Thus the gas can escape from the liquid polystyrene by rupture of the cells produced during expansion, due to the low viscosity of the polystyrene at high extrusion temperatures. However, at lower extrusion temperatures, the viscosity of the polystyrene is sufficiently high to retain the gas within the cells of the expanded polystyrene. It should be noted that the expanding agent may become a gas within the extruder chamber, head or die if too high temperatures and too low pressures are employed. This produces an undesirable foam structure having only a few large cells so that the expanded members do not have the characteristics referred to above.

In order to produce a thermoplastic foam of a desirable structure having a great plurality of small gas cells, the thermoplastic material is "nucleated." By this nucleation process, a large number of centers for the formation of gas in the viscous liquid polystyrene are provided in order to allow the expanding gas to be distributed more uniformly through the liquid. Thus a plurality of separated nuclei are provided by the powdered expansion agent in the liquid polystyrene to serve as centers for the formation of gas cells. The nucleating agent employed in mixture 14 to produce the expanded polystyrene members of the present invention is sodium bicarbonate which also reacts with the citric acid to produce carbon dioxide gas. In addition, while the blue toner is employed primarily as a coloring material, it has been found that this pigment also functions as a nucleating agent due to the fact that it is incompatible with polystyrene. It should be noted that the polystyrene bead base material, discussed in the above example, contains some nucleating agent in the form sold by Koppers Company. However, it is necessary to add additional nucleating agents in order to obtain the desired density. Thus the density and resiliency characteristics of the expanded thermoplastic members are controlled by the ratio of nucleating agents to the polystyrene. In addition, some nonfoaming high impact polystyrene may be employed as an additive to increase the strength of the expanded members.

When the expanded thermoplastic member 78 has the trilobular cross section of FIG. 3 with a height of approximately one-half inch and the length of about $13/16$ of an inch, the member has the following characteristics for example. It requires about 9.9 pounds of force to be applied perpendicular to the end surface 80 in order to obtain a 50% depression of such member in the axial direction, and about 8.01 pounds of force applied perpendicular to the apex of one of the three extensions 85 of the side surface to obtain a similar 50% depression in a direction perpendicular to the axis of such member. Also when a plurality of the resilient members are employed as loose fill packing material, having a depth of four inches and a surface area of 36 square inches, a force of 10 pounds per square inch produced 1.0 inch of compression. Of course, the cross sectional shapes of both the expanded member 78 and the unexpanded member 86 are determined by the extrusion opening 101 in the die 26 and the length of these members is determined by the speed of the rotating cutter 46 and the foam strip 36. Thus while the expanded member may be cut to any desired length for different packing characteristics, a range of lengths found most suitable for general purpose packing material is from $3/8$" to $1\frac{1}{2}$".

It will be obvious to those having ordinary skill in the art that many changes may be made in the details of the preferred embodiment of the present invention without departing from the spirit of that invention. Therefore, the scope of the invention should be determined by the following claims.

I claim:
1. Loose-fill packing material, comprising:
a plurality of resilient members of expanded thermoplastic material; and
surface indentation means on each of said members for causing the outer surfaces of adjacent contacting members to interlock and prevent relative movement thereof when said members are compressed together but to also allow said material to flow when said members are free from such compression so that said members may be poured into a container like a granular fluid.

2. Loose-fill packing material, comprising:
a plurality of resilient members of expanded plastic material having substantially the same configuration; and
concave surface means on each of said members for causing the outer surfaces of adjacent contacting members to interlock and prevent relative movement thereof when said members are compressed together but to also allow said material to flow when said members are free from such compression so that said members may be poured into a container like a granular fluid.

3. Loose-filled packaging material, comprising:
a plurality of resilient members of expanded thermoplastic material,
each of said members being of a generally cylindrical shape; and
surface indentation means on each of said numbers for causing the outer surfaces of adjacent contacting members to interlock and prevent relative movement thereof when said members are compressed together but to also allow said material to flow when said members are free from such compression so that said members may be poured into a container like a granular fluid.

4. Loose-fill packing material, comprising:
a plurality of members of resilient plastic foam;
said members having end surfaces and a generally cylindrical side surface between said end surfaces; and
concave means on said side surface on each of said members to cause adjacent contacting members to interlock and prevent relative movement between such adjacent members and to enable said members to be poured into a container like a granular fluid.

5. Loose-fill packing material, comprising:
a plurality of members of resilient thermoplastic foam;
said members being of substantially the same shape and having end surfaces and a generally cylindrical side surface between said end surfaces; and
surface indentation means including longitudinal grooves in said side surface on each of said members to cause adjacent contacting members to interlock and prevent relative movement between such adjacent members and to enable said members to be poured into a container.

6. Loose-fill packing material, comprising:
a plurality of resilient members of expanded polystyrene;
said members being of trilobular cross section and having end surfaces and a generally cylindrical side surface between said end surfaces;
surface indentation means on said side surface of each of said members to cause adjacent contacting members to interlock and prevent relative movement between such adjacent members and to enable said members to be poured.

7. A packaging member of expandable thermoplastic material containing an expanding agent having a boiling point below the incipient softening point of said thermoplastic material;
said member being of a substantially cylindrical shape having two end surfaces and a side surface including parallel extending surface elements between said end surfaces;
a cross section of said member taken perpendicular to said surface elements being of a Y-shaped configuration.

8. Packaging material, comprising:
a plurality of substantially unexpanded members of expandable thermoplastic material containing an expanding agent; and
surface indentation means on each of said members for causing the members to interlock after said members are expanded to prevent adjacent contacting members from moving relative to one another appreciably under unloaded conditions and to enable the expanded members to be poured into a container like a granular fluid under unloaded conditions.

9. Packaging material, comprising:
a plurality of substantially unexpanded members of expandable thermoplastic resin containing an expanding agent which emits gas when heated to expand said resin into a porous foam structure; and
surface indentation means on each of said members for causing the members to interlock after they are expanded to prevent relative movement between adjacent contacting members and to enable the expanded members to be poured together into a container.

References Cited by the Examiner
UNITED STATES PATENTS

| | | | |
|---|---|---|---|
| 1,044,636 | 11/12 | Evans | 161—168 |
| 2,941,964 | 1/60 | Houston et al. | 260—2.5 |
| 2,994,670 | 8/61 | D'Alelio | 260—2.5 |
| 3,004,294 | 10/61 | Richard et al. | 18—48 |
| 3,004,935 | 10/61 | Raley et al. | 260—2.5 |
| 3,042,972 | 7/62 | Lafferty | 18—48 |
| 3,066,382 | 12/62 | Zweigle et al. | 161—168 |
| 3,074,543 | 1/63 | Stanely. | |
| 3,077,633 | 2/63 | Raynolds et al. | 264—177 |

FOREIGN PATENTS 843,483   8/60   Great Britain.

OTHER REFERENCES

Koppers booklet: "Dylite expandable-polystyrene," 1954, pp. 20–21.

EARL M. BERGERT, *Primary Examiner.*

A. H. BRODMERKEL, *Examiner.*

UNITED STATES PATENT OFFICE
CERTIFICATE OF CORRECTION

Patent No. 3,188,264　　　　　　　　　　　　　　June 8, 1965

Robert E. Holden

It is hereby certified that error appears in the above numbered patent requiring correction and that the said Letters Patent should read as corrected below.

Column 7, line 25, for "Loose-filled" read -- Loose-fill --; line 30, for "numbers" read -- members --; line 42, after "concave" insert -- surface --; column 8, line 27, for "unloaded" read -- loaded --; line 46, for "1/60" read -- 6/60 --; line 52, for "Stanely" read -- Stanley --.

Signed and sealed this 7th day of December 1965.

(SEAL)
Attest:

ERNEST W. SWIDER
Attesting Officer

EDWARD J. BRENNER
Commissioner of Patents